US005160375A

United States Patent [19]

Otaki

[11] Patent Number: 5,160,375

[45] Date of Patent: Nov. 3, 1992

[54] INTERNAL COATING MATERIALS FOR A CATHODE RAY TUBE

[75] Inventor: Shiro Otaki, Tokyo, Japan

[73] Assignee: Acheson Industries, Inc., Port Huron, Mich.

[21] Appl. No.: 474,472

[22] Filed: Feb. 2, 1990

[30] Foreign Application Priority Data

Feb. 15, 1989 [JP] Japan ........ 1-35437

[51] Int. Cl.[5] ........ C04B 14/06

[52] U.S. Cl. ........ 106/475; 106/470; 252/506; 313/479

[58] Field of Search ........ 106/470, 475; 313/450, 313/479; 427/64; 252/506

[56] References Cited

U.S. PATENT DOCUMENTS

| | | | |
|---|---|---|---|
| 2,951,773 | 2/1956 | Helle et al. | 427/64 |
| 3,518,116 | 6/1970 | Stock et al. | 252/506 |
| 3,791,546 | 2/1974 | Maley et al. | 313/479 |
| 4,210,844 | 7/1980 | Buescher et al. | 313/479 |
| 4,342,943 | 8/1982 | Weaver | 501/20 |
| 4,379,762 | 4/1983 | Chiyoda et al. | 313/479 |
| 4,425,377 | 1/1984 | Deal et al. | 427/64 |
| 4,623,820 | 11/1986 | Deal et al. | 427/64 |
| 4,760,310 | 7/1988 | Deyama et al. | 313/479 |
| 4,963,751 | 10/1990 | Kano et al. | 427/34 |

*Primary Examiner*—Karl Group
*Assistant Examiner*—Sue Hollenbeck
*Attorney, Agent, or Firm*—Dinnin & Dunn

[57] ABSTRACT

A coating composition for a cathode ray tube, comprising the ingredients of: silica powder which has been fused during the process of flame spraying, said silica powder having an average particle size of about 0.02 to about 15 microns, electrically conductive graphite powder, with the pigment ratio of silica to graphite being within the range of 0.1 to 15, an organic thickening agent, water glass, and the balance water, said coating composition having a viscosity within the range of about 270 to about 850 cps; and wherein the coating provides markedly improved intercoat adhesion between overlapping coatings on the interior funnel of the cathode ray tube.

5 Claims, 6 Drawing Sheets

INTERNAL COATING MATERIALS FOR A CATHODE RAY TUBE

DESCRIPTION OF THE INVENTION

This invention broadly relates to internal coating materials for a cathode ray tube which are characterized by the fact that, in order to increase the electric resistivity of the internal coating, a non-conductive pigment which is predominantly comprised of metal oxides or oxides, and silica powders specially made by spraying and fusing with the average primary particle size of 0.05 to 3, or more broadly 0.02 to 15 micron on average, and the maximum primary particle size at 20 micron (or more preferably at 15 micron) are used together with electrically conductive graphite powders at the mixing ratio from 0.1 to 15.

The problem underlying the invention deals with inter-coat adhesion between overlapping coatings on the interior of a cathode ray tube.

The invention herein refers to such internal coating materials in which silica powders are used which have been fused in the process of flame spraying, along with other optional mineral products of similar chemical compositions, and/or optional artifical materials with similar chemical compositions which are powdered or in finely particulated form.

This invention also relates to internal coating compositions of the type described above in which one of, or more than one of, the non-conductive materials, such as iron oxide, titanium oxide, chromium oxide, aluminum oxide, and silicon carbide are selectively used together with the silica powder.

The internal coating materials described herein have an electric resistance, broadly stated from 0.075 to 50,000 ohm cm, preferably from 0.15 to 20,000 ohm cm, or most preferably from 1 to 1,000 ohm cm.

Internal coating materials referred to herein are to be applied over a part of, or the entire internal surface of, a funnel of a TV cathode ray tube, at the thickness of 3 to 50 micron, or more preferably 8 to 30 micron.

DETAILED EXPLANATION

This invention is related to the internal coating materials to be applied over cathode ray tubes including TV cathode ray tubes.

Normally an electrically conductive coating is applied on an internal surface of a funnel of a black and white TV (or a color TV) cathode ray tube which is mainly composed of graphite powders and sodium or potassium water glass. This coating serves to accelerate electrons by applying a high electric voltage, to increase the clarity color by capturing secondary electrons which are generated from a shadow mask etc. and for other functions. Normally the required resistivity is 0.03 to 0.3 ohm cm and such a coating is called a normal resistance internal coating. In the coated area of a color TV, a high resistance internal coating is required and is widely used, such that it can suppress the peak value of a surge current when an unexpectedly great electric current flows through the internal coating.

A stable and non-conductive inorganic pigment is used together with graphite powders to make such an internal coating material. Such pigments are for example titanium oxide, iron oxide, zinc oxide, etc. For instance see U.S. Pat. No. 4,272,701 (GTE Products Corporation) which explains the relation between the heat of formation and chemical stability of chromium oxide, aluminum oxide and titanium oxide. Various works have been reported which also discussed the possibility of using nickel oxide, manganese oxide, magnesium oxide, cobalt oxide and aluminum oxide.

Other disclosures which show the state of the art are presented in Japan Patent Nos. Sho-22055, Sho 52-6871 and Sho-45428, and in the following references:

| | | |
|---|---|---|
| Chiyoda et al | U.S. Pat. No. 4,379,762 | April 12, 1983 |
| Deyama et al | U.S. Pat. No. 4,760,310 | July 26, 1988 |
| Dominick et al | U.S. Pat. No. 4,052,641 | October 4, 1977 |
| Speigel | U.S. Pat. No. 4,163,919 | August 7, 1979 |
| Japan Patent Appln. No. 53-1990 (Japan Patent No. SHO 54-95170) filing date 1/13/78) | | |
| Japan Patent Appln. No. 53-72066 (Japan Patent Publication No. 62-52422 dated 11/5/87) | | |
| Japan Patent Appln. No. 57-58123 (Japan Laid Open No. 58-176854 dated 10/17/83) | | |
| Japan Patent Appln. No. 58-44250 (Japan Laid Open No. 59-171439 dated 9/27/84) | | |

PROBLEMS UNDERLYING THE PRESENT INVENTION

The oxides referred to above are relatively thermodynamically unstable being reduced from a normal oxidation state to a lower oxidation state resulting in the generation of oxygen, followed by the generation of carbon monoxide as the result of the reaction of oxygen and graphite powders. It goes without saying these gases deteriorate the degree of vacuum and cause a wasteful consumption of barium.

No ideal high resistance internal coatings have become available as yet, which are satisfactory respecting desired electric resistivity, excellent cohesion (tape test), and desired stability. In particular composing materials (particles) come off the coating (or are detached from the surface of the coating) when certain types of the metal oxides are used at the time when an electron gun is inserted into the tube and when the TV is in use. This undesirable property of prior coatings is observed in the tape test.

In the present invention, work was carried out on silica powders and a range of electrically resistive internal coatings were prepared and evaluated. No internal coatings with satisfactory properties were obtained by use of commonly known colloidal silica, silica powders made either by the sol or the gel method both based on the wet process, nor silica powders produced as a biproduct of the manufacture of metallic silicon. However it was discovered that an internal coating with excellent properties was obtainable when silica powders having a specified particle size range, and special shape and surface nature were employed. The silica powder is comprised primarily of silica (but minor amounts of other minerals of similar chemical composition or artificial materials of similar chemical composition may also be present). The silica powders are fused during the process of flame spraying (and this is what is meant by the terminology "fused and sprayed" as is sometimes used herein).

SUMMARY OF THE INVENTION

It has been unexpectedly discovered in the present invention that the deficiencies of the previously known coatings can be solved by using the internal coating materials for a cathode ray tube which are produced by using the spray-fused silica powder with the average primary particle size broadly between 0.02 and 15 micron (preferably between 0.05 and 3 micron) and the maximum primary particle size less than 20 micron, broadly stated, and preferably less than 15 micron; together with the electrically conductive graphite powders at the mixing weight ratio of 0.1 to 15; and preferably mixing weight ratio (i.e., pigment ratio) of silica to graphite of from about 1 to about 10. The use of the ratio of silica to graphite in the range from 1.5 to 4.0 generally results in the electric resistivity of about 2.0 ohm cm to about 11 ohm cm.

This invention also includes a formulation in which a part of the silica powder is replaced by other metallic oxides, or other non-conductive pigments, and which has the above range of resistivity.

DESCRIPTION OF THE PREFERRED EMBODIMENTS

Such electrically conducting internal coating dispersions as disclosed herein can be applied not only by brush coating, but also by sponge, spray, spray followed by flow, flow, or dip coating methods.

The spray-fused silica powders are generally spherical, or of hexahedron shape, or similar shapes, having the average size of the primary particle broadly of 0.02 to 15 micron (preferably 0.05 to 3 micron) average particle size, and the maximum primary particle size of 20 micron. The fused and sprayed ("spray-fused") silica powders above with the preferred average primary particle size between 0.02 and 15 micron and more preferably 0.05 to 3 micron, resulted in internal coating materials far superior to previously existing products respecting various properties needed for practical industrial use, such as, conductivity and resistivity; and further respecting intercoat adhesion as shown by the tape test which indicates how firmly the components in the dried coat matrix adhere to each other (e.g., in certain areas where the coatings overlap as occurs in practical usage).

The result of the tape test will be discussed by referring to the attached figures (photographs).

FIG. 2-1 to FIG. 2-11 (Photo 1, 2, 3, 4, 5, 6, 7, 8, 9, 10 and 11) show the tapes after the tape test, by use of an adhesive tape conducted by the normal tape test practice, of the internal coatings for a cathode ray tube comprising graphite powders and various types of silica powders as non-conductive metallic oxide. These coatings were applied over a glass panel by a brush, dried at 150° C. for 30 minutes and then baked at 430° C. for 1 hour before the tape test. FIG. 2-12 (Photo 12) shows the tape of the tape test of the internal coating of the present invention (Formulation 9) applied over a panel and Dag5610 (a normal resistance internal coating of Acheson company) which was applied after Formulation 9 with a small overlapping area. FIG. 2-13 (Photo 13) shows the tape after the tape test of the commercially existing high resistance internal coating comprising a metallic oxide applied over a glass panel and the commercially existing normal resistance internal coating applied with a small overlapping area in the same way as before. (See further discussion in Working Example A).

WORKING EXAMPLE A

The inside wall of a CRT tube is often coated with a high resistance internal coating and a normal resistance coating successively (Ref. FIG. 1). These two coatings are applied with an overlapping area narrower than a few centimeters. It is one of the critical technical requirements as to how firmly the components such as graphite powders are adhering to each other in the matrix of the overlapping area. Photo 12 (FIG. 2-12) shows the tape of the tape test of Formulation 9 (see Test Series 2) or the high resistance internal coating of the present invention and Dag5610 (a normal resistance internal coating) of Acheson Company successively applied. Photo 13 (FIG. 2-13) shows the tape of a prior existing high resistance internal coating containing a metallic oxide and an existing normal resistance internal coating successively applied. The area of the tapes indicating the area of a high resistance internal coating indicates the superior property of Formulation 9 of the present invention. The tape is pressed against the normal resistance internal coating in the overlapping area. The tape test of Dag5610, a normal resistance internal coating of Acheson Company, appears much better than that of the existing normal resistance internal coating when corresponding high resistance internal coatings are underlying.

Other advantages of (spray-fused) silica powders as described herein over other known non-conductive pigments are as follows. It is larger than many commonly used metallic oxide powders. Therefore the statistical chances are much less for such powders to be detached accidentally, to fly up inside the funnel, and subsequently to cause the short circuit of the electrodes of an electron gun.

The reduction reaction of other metallic oxides is relatively likely to take place due to the relatively small heat of reaction. In comparison, silica is much more stable. Chromic oxide has been discussed as a technical possibility. However it is difficult to secure a source of supply that can produce chromic oxide in quantity which is satisfactory with respect to particle size and the content of sulfur-containing compounds, which are one of the most harmful materials for a cathode ray tube.

As will be seen in Working Example 2, the materials covered by the present invention, especially silica powders made by fusing and spraying will provide a coating having an electric resistivity continuously changing over a wide range, within a workable viscosity value, by altering the pigment ratio of silica to graphite. The tape test results are also very beneficial in the above range of resistivity. It is widely practiced in the industry to apply both a normal resistance internal coating and a high resistance internal coating in the front and rear areas respectively, of a cathode ray tube, for the purpose of controlling the overall resistance of the internal coating. If silica powders produced by spraying and fusing as described in this invention are employed, and if circuitry suitable for the inhibition of flash is also employed then it will become possible to coat the entire funnel surface with one kind of coating whose resistivity is controlled to a desired value by selecting a specific mixing ratio (pigment ratio) of the spray-fused silica powders to graphite.

Another important feature of this invention is clearly shown by Working Example A (Photo 12 and 13). That is, a tape test was conducted on an overlapping area of a high resistance internal CRT coating and a normal resistance internal CRT coating. In the above test, the combination of Formulation 9 of the present invention and Dag5610 (or other normal resistance internal CRT coating of Acheson Company) was far better than the combination of other existing high resistance internal CRT coatings containing a metallic oxide and an existing normal resistance internal coating. In both cases the tape was brought into contact with a normal resistance internal coating over the overlapping area. The tape test of Dag5610 (a normal resistance internal coating of Acheson Company) became incomparably good when the high resistance coating of the present invention (Formulation 9) was underlying. The reason that such excellent results have been obtained with the present invention is unknown.

MANUFACTURING METHOD AND TEST PROCEDURE

The present invention will be explained in more detail as follows by showing working examples. Various silica powders employed in the working examples are as follows.

| | | | Average diameter of primary particle (micron) |
|---|---|---|---|
| 1) | Colloidal silica<br>Nissan Chemical Co. | Snowtex ZL | 0.1 |
| 2) | Colloidal silica<br>Nissan Chemcial Co. | Snowtex C | 0.01–0.02 |
| 3) | Wet process silica<br>Nippon Silica Co. | E 150K | 1 |
| 4) | Wet process silica<br>Nippon Silica Co. | E 75 | 1 |
| 5) | Wet process (Gel process) silica<br>Fuji Davidson Co. | Cylloid 66 | 0.5 |
| 6) | Silica, by-product of metallic silicon production<br>ELKEM Materials A/S | Microsilica 580-V | 4 |
| 7) | Powered silica (silica rock mechanically powdered)<br>Tatsumori Co. | Crystallite VX-X | 1 |
| 8) | Fused and powdered silica rock (silica rock fused and powdered after cooling)<br>Tatsumori Co. | Fuse FF | 2 |
| 9) | Spray-fused silica powder, i.e., fused in the process of flame spraying<br>Micron Co. | Harimic S-OF | 2.3 |

MANUFACTURING METHOD FOR COATING DISPERSIONS

Such internal coatings or dispersions are usually produced by charging water glass, that is, an aqueous solution of a silicate of an alkali metal (especially sodium silicate or potassium silicate), graphite powers, non-conductive pigments, an organic thickener such as PVA and CMC, and a small amount of a dispersing agent such as sodium lignin sulfonate, into a pebble mill, and by rolling it for a required period of time.

Coating dispersions were manufactured as below.

| | Weight % |
|---|---|
| Graphite powders | 5.5 |
| Silica powders | 12.7 |
| CMC | 1.0 |
| Potassium water glass (28% Solids) | 37.7 |
| Deionized water | 43.1 |
| | 100.0 |

The above raw materials were charged into a pebble mill and rolled for 15 to 25 hours.

TEST PROCEDURES

Following is the evaluation method for the coating dispersions prepared.

| | |
|---|---|
| (1) | Viscosity measurement<br>B type revolution viscometer of Tokyo Keiki Company<br>(a rotational viscometer) |
| (2) | Tape test<br>Nichiban Cello-tape No. 405 |

An internal coating dispersion was brush-applied onto a glass panel 6 cm × 15 cm, dried at 150° C. for 30 minutes and then baked at 430° C. for 1 hour. The tape test was carried out after cooling to the room temperature.

WORKING EXAMPLE 1

Nine kinds of silica powders explained previously are the various different types of silica powders used. The experimental data and observations are tabulated as follows. The same evaluation was made on a dispersion prepared by the above Manufacturing Method containing spray-fused silica powders 8.47%, and iron oxide 4.23% (Formulation 10). The result of tape test is shown in FIG. 2-10 (Photo 10).

The same evaluation was also conducted on a dispersion prepared by said Manufacturing Method containing spray-fused silica powders 8.47%, and silicon carbide, 4.23% (Formulation 11). The result of tape test is shown in FIG. 2-11 (Photo 11).

TABLE 1

Example Formulations - Test Series 1:
Working Example (1): Evaluation of coatings manufactured by use of 9 different types of silica powders.

| Types of silica *1 powders | Viscosity *4 (cps) | Electric resistance (ohm cm) | Tape test | Evaluation |
|---|---|---|---|---|
| Formulation 1<br>Colloidal silica<br>Snowtex ZL | 1,260 | 3.08 | Poor<br>(FIG. 2-1)<br>(Photo 1) | Viscosity became too high when silica powders were increased to attain the required electric resistance. Tape test was poor. |
| Formulation 2<br>Colloidal silica<br>Snowtex C | 1,380 | 2.03 | Poor<br>(FIG. 2-2)<br>(Photo 2) | Same as Formulation 1. |
| Formulation 3<br>Silica (Wet process)<br>E 150K *2 | 6,250 | 2.16 | Poor<br>(FIG. 2-3)<br>(Photo 3) | Same as Formulation 1. |
| Formulation 4<br>Silica (Wet process)<br>E 75 | 3,400 | 6.48 | Poor<br>(FIG. 2-4)<br>(Photo 4) | Same as Formulation 1. |
| Formulation 5<br>Silica (Wet process)<br>—Gel method) | 7,900 | 4.75<br>(FIG. 2-5)<br>(Photo 5) | Poor | Same as Formulation 1. |

TABLE 1-continued

Example Formulations - Test Series 1:
Working Example (1): Evaluation of coatings manufactured by use of 9 different types of silica powders.

| Types of silica *1 powders | Viscosity *4 (cps) | Electric resistance (ohm cm) | Tape test | Evaluation |
|---|---|---|---|---|
| Cylloid 66 *3 | | | | |
| Formulation 6 By-product of silicon manufacture Microsilica 580-V | 870 | 2.27 | Fair (FIG. 2-6) (Photo 6) | Viscosity became too high when silica powders were increased to attain the required electric resistance. |
| Formulation 7 Silica rock (mechanically powdered) Crystallite VX-X | 1,589 | 3.00 | Fair (FIG. 2-7) (Photo 7) | Same as Formulation 6. |
| Formulation 8 Silica rock (fused and powdered after cooling) Fuse FF | 990 | 1.99 | Fair (FIG. 2-8) (Photo 8) | Same as Formulation 6. |
| Formulation 9 Silica rock (fused and sprayed) Harimic S-OF | 660 | 4.29 | Excellent (FIG. 2-9) (Photo 9) | Both viscosity and electric resistance fell into the ranges that were required. Viscosity remained appropriate if the resistance was changed. Tape test was much better than an existing high resistance coating. |

*1: The particle sizes and the suppliers have been given before.
*2, *3: Both viscosity and electric resistance became too high if manufactured according to Manufacturing method 1. Thus the ratio silica/graphite was reduced to 1.2. (Manufacturing method 2).
*4: The values required by the brush-coating are about 300 to 850 cps.

WORKING EXAMPLE 2

Test Series 2

The electric resistivity can be varied by changing the pigment ratio of silica powders (manufactured by fusing and spraying) to graphite powders. According to the example of the manufacturing method for preparing the coating dispersions, the total weight percent of silica powders and graphite is 18.2%. A series of experiments were carried out by changing the ratio of silica powder to graphite but by maintaining the total weight percent constant at 18.2%.

TABLE 2

| | a | b | c | d | e | f | g | h |
|---|---|---|---|---|---|---|---|---|
| pigment ratio | 0 | 0.1 | 0.28 | 0.40 | 1.5 | 2.3 | 3.0 | 4.0 |
| Viscosity (cps) | 130 | 290 | 430 | 510 | 550 | 640 | 645 | 670 |
| Electric resistance (ohm cm) | 0.07 | 0.09 | 0.13 | 0.173 | 2.0 | 4.29 | 5.50 | 11.3 |

| | i | j | k | l | m | n |
|---|---|---|---|---|---|---|
| pigment ratio | 5.0 | 8.0 | 10.0 | 14.2 | 15 | ∞ |
| Viscosity (cps) | 670 | 690 | 690 | 690 | 750 | 820 |
| Electric resistance (ohm cm) | 13.0 | 14,500 | 18,000 | 39,000 | 50,000 | ∞ |

All the above formulations are advantageous and satisfactory with respect to viscosity, tape test and the appearance of a dry coat on an inside wall of a funnel.

BRIEF EXPLANATION OF THE DRAWING FIGURES (OR ILLUSTRATIONS)

FIG. 2-1 to FIG. 2-9 show the tape tests of various internal coatings for a cathode ray tube containing different types of silica powders for a comparison of the adhesion of each component in the coating matrix.

FIG. 2-10 shows the tape of the tape test of an internal coating containing silica powders made by fusing and spraying, and iron oxide powders, as non-conductive pigments.

FIG. 2-11 shows the tape of the tape test of an internal coating containing silica powders made by fusing and spraying, and silicon carbide powders, as non-conductive pigments.

FIG. 2-12 shows the tape test of Dag5610, a normal resistance internal coating of Acheson Company, applied over a high resistance internal coating of the present invention (Formulation 9).

FIG. 2-13 shows the tape test of an existing normal resistance internal coating applied over an existing high resistance internal coating containing a metallic oxide.

Figure 1:
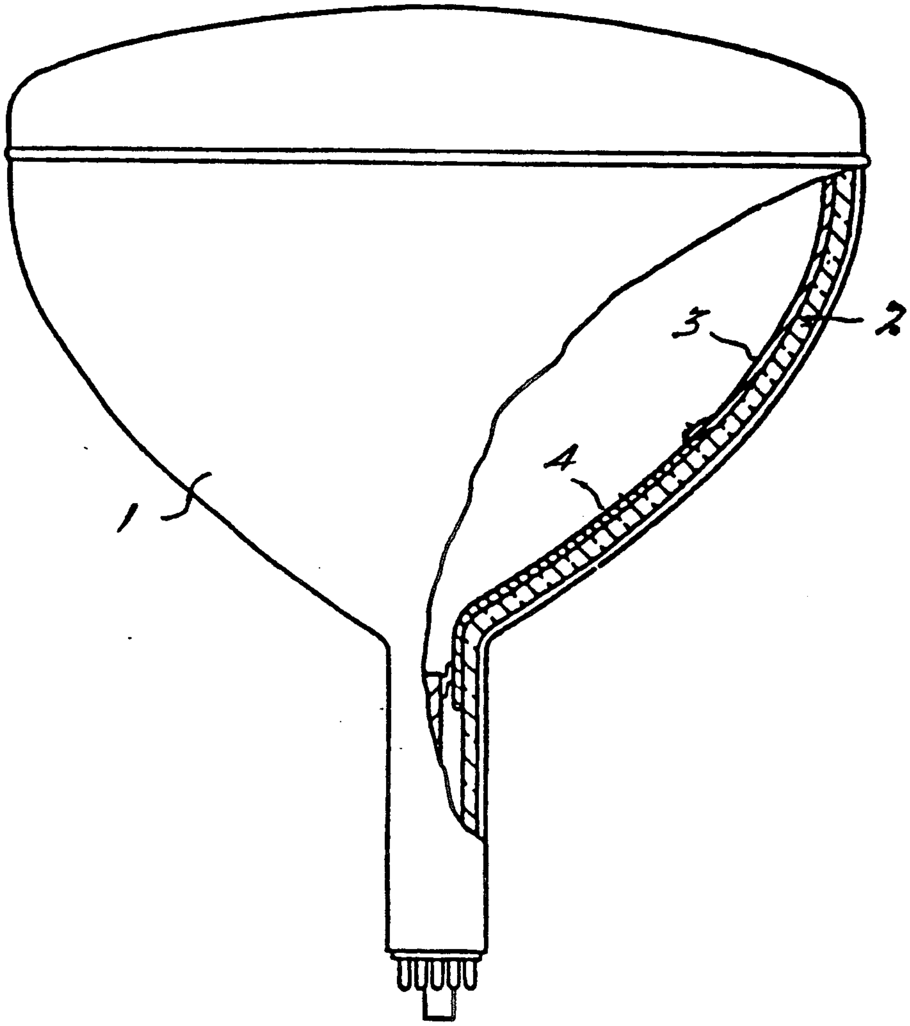
FIG. 1 illustrates briefly a color TV tube with a cross-section portion showing a normal resistance and a high resistance internal coatings.
Figures 1, 2:
Figure 2:
Figures 2, 3:
Figures 2, 3, 4:
Figures 2, 3, 4, 5:
Figures 2, 3, 4, 5, 6:
Figures 2, 3, 4, 5, 6, 7:
Figures 2, 3, 4, 5, 6, 7, 8:
Figures 2, 3, 4, 5, 6, 7, 8, 9:
Figures 2, 3, 4, 5, 6, 7, 8, 9, 10:
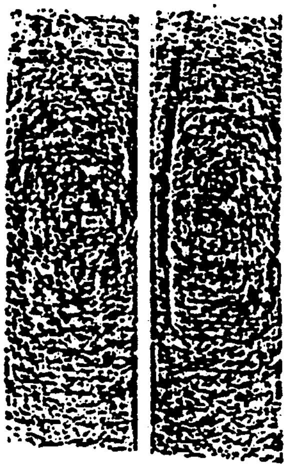
Figures 2, 3, 4, 5, 6, 7, 8, 9, 10, 11:
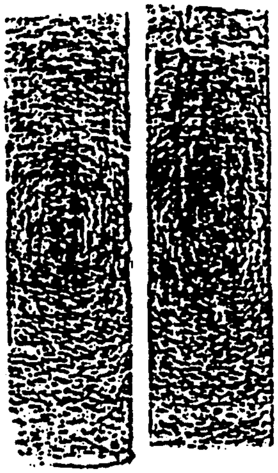
Figures 2, 3, 4, 5, 6, 7, 8, 9, 10, 11, 12:
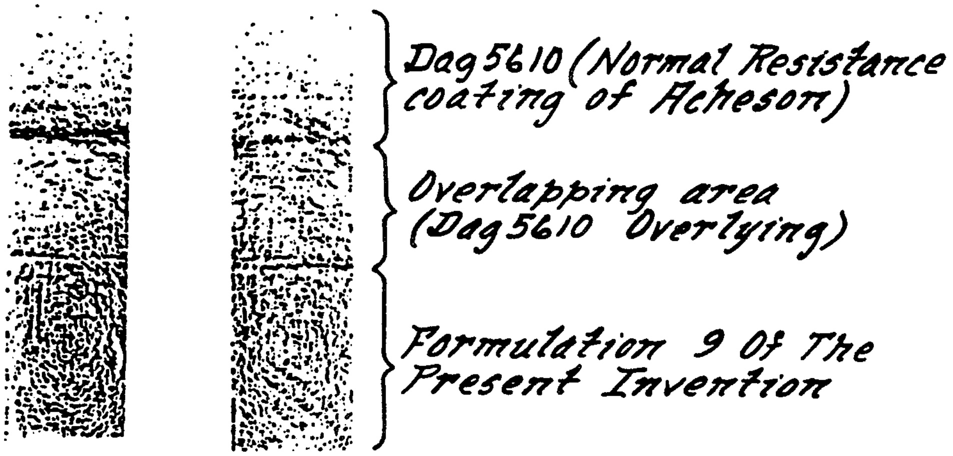
Figures 2, 3, 4, 5, 6, 7, 8, 9, 10, 11, 12, 13:
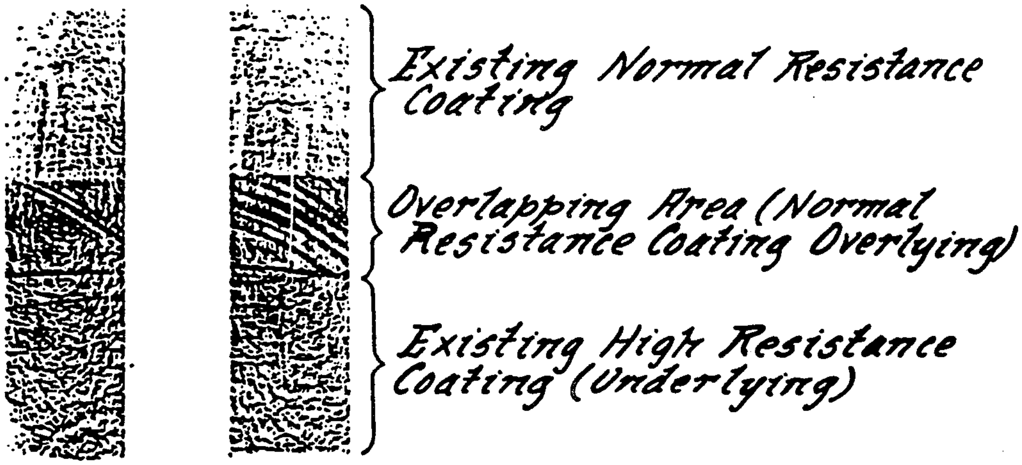

In FIG. 1 the elements 1, 2, 3, and 4 are a funnel, a glass wall, a normal resistance internal coating and a high resistance internal coating, respectively.

A particularly preferred coating composition in accordance with the invention is as follows:

| | Weight % |
|---|---|
| Electrically conductive graphite powder (preferably synthetic graphite) (having a particle size within the range of about 1 to about 7 microns) | 5.5 |
| Silica powder (fused and sprayed) (Harimic S-OF 2) | 12.7 |
| CMC | 1.0 |
| Potassium water glass (28% solids) | 37.7 |
| Water (preferably deionized) | 43.1 |
| | 100.0 |

This coating composition is prepared as described in the Manufacturing Method above.

The properties of the internal coating material for cathode ray tubes as described in this invention are generally as follows.

The electric resistance of the coating should broadly be within the range of about 0.075 to about 50,000 ohm cm; and preferably within the range of about 0.15 to about 20,000 ohm cm; and best results have been obtained when the electric resistance of the coating is maintained within the range of about 1 to about 1,000 ohm cm.

The thickness for the applied coatings, for example on the inside of a cathode ray tube, should generally be within the range of about 3 to about 50 microns thickness for the coating, and preferably within the range of about 8 to about 30 microns thickness for the coating.

The silica powder should have an average particle size within the range of about 0.02 to about 15 microns and preferably within the range of about 0.05 to about 3 microns.

The maximum primary particle size for the silica powders should be about 20 microns or less, and preferably less than about 15 microns.

The viscosity range for the coating composition prior to application should be within the range of about 270 to about 850 cps.

The graphite powder should preferably be a synthetic graphite, or a purified natural graphite can also be used. The graphite powder should have a particle size, broadly stated within the range of about 0.1 to about 30 microns, and preferably within the range of about 1 to about 7 microns.

What is claimed is:

1. A coating composition for a cathode ray tube, consisting essentially of:
- silica powder which has been fused during the process of flame spraying,
  - said silica powder having an average particle size of about 0.02 to about 15 microns,
- electrically conductive graphite powder,
  - with a pigment ratio of silica to graphite within the range of 0.1 to 15,
- an organic thickening agent,
- water glass,
- and water,
- said coating composition having a viscosity within the range of about 270 to about 850 cps; and wherein
- said coating is applied at a thickness of about 3 to about 50 microns, and provides an electric resistance of 0.075 to 50,000 ohm cm.

2. The composition of claim 1 wherein, said coating is applied at a thickness of about 8 to about 30 microns, and provides an electric resistance of 0.15 to 20,000 ohm cm.

3. The composition of claim 2 wherein,
- said pigment ratio is within the range of about 1 to about 10,
- said silica powder average particle size is within the range of about 0.05 to about 3.

4. The composition of claim 2 wherein said electric resistance is within the range of about 1 to about 1000 ohm cm.

5. The composition of claims 2, 3 or 4 wherein,
- said thickening agent is carboxymethyl cellulose,
- and the water glass is potassium water glass.

* * * * *